United States Patent [19]

McNesky et al.

[11] 4,415,075
[45] Nov. 15, 1983

[54] WALL MOUNTED LIGHT WEIGHT AUTOMATIC WATER DISTILLER

[75] Inventors: Guy P. McNesky, Port St. Lucie; E. Dale Rice, Tampa, both of Fla.

[73] Assignee: General Molding, Inc., Tampa, Fla.

[21] Appl. No.: 302,883

[22] Filed: Sep. 16, 1981

[51] Int. Cl.³ .............................................. B01D 3/02
[52] U.S. Cl. .................................... 202/177; 202/181; 202/196
[58] Field of Search ................. 202/83, 163, 166, 167, 202/176, 177, 181, 185 R, 196, 206, 232, 233–235, 237, 270; 138/45; 137/859

[56] References Cited

U.S. PATENT DOCUMENTS

| | | | |
|---|---|---|---|
| 2,705,218 | 3/1955 | Canicoba | 202/206 |
| 2,960,109 | 11/1960 | Wilson | 137/859 |
| 3,825,491 | 7/1974 | Sanchez | 202/206 |
| 4,239,601 | 12/1980 | Lemoine | 202/181 |

*Primary Examiner*—Frank Sever
*Attorney, Agent, or Firm*—Remy J. VanOphem

[57] ABSTRACT

A compact, fully automatic water distilling unit is disclosed consisting of a tubular vaporizing tank with an attached condenser preheater disposed alongside which receives incoming feed water, prior to entry into the vaporizing tank via a rim trough extending about the tank. The assembly is adapted to be wall mounted and to discharge distilled water into a reservoir tank. The automatic controls include a float switch in the vaporizing tank controlling the inflow of fill water, a low level safety switch in the reservoir shutting off the heater upon the decline of water level below a minimum. A float switch arrangement is mounted in the reservoir to shut off the heater and water inflow upon filling of the reservoir. Also disclosed is an overflow passage, allowing overflow to be routed to a drain.

8 Claims, 2 Drawing Figures

WALL MOUNTED LIGHT WEIGHT AUTOMATIC WATER DISTILLER

BACKGROUND OF THE INVENTION

The health benefits of having available in the home distilled water, both for drinking and other purposes, are well known. However, the cost of purchasing distilled water from dealers is high, and it also is inconvenient due to the need for handling of large volume containers.

Accordingly, it would be advantageous to homeowners and others to be able to distill water from the water supply available in the home. As with other such items of home equipment, it would be highly desirable if the distiller would be fully automatic such as to require minimum attention by the user. In addition, the automatic controls should preferably include a means for insuring that failure of the heating system or other components does not result in safety hazards or other undesirable results, such as flooding of the surrounding area due to a valve failure.

It would also be desirable if such unit could be compact and adapted to be mounted adjacent to the point of use of the distilled water, i.e., the kitchen or other living areas of the home. While there has been heretofor provided and proposed many designs for water distillers which include various automatic controls and which operate relatively efficiently, none of these designs has combined all of the features into a compact, light weight design suitable for use as a home distiller.

It also would be advantageous that such home distilling be relatively efficient due to the high cost of energy, in particular, electrical energy, and the relatively great amounts of heat required to heat and to vaporize water.

Accordingly, it is an object of the present invention to provide a distiller which is fully automatic.

It is another object of the present invention to provide a distiller in which such automatic controls are combined with safety features to largely eliminate the possibility of failures of a type resulting in safety hazards or in damage to the surrounding areas.

Still another object of the present invention is to provide a distiller for water which is light weight, compact and able to be mounted conveniently in the living areas of the home, adjacent to the points of use.

Still another object of the present invention is to provide such distiller which operates relatively efficiently.

SUMMARY OF THE INVENTION

These and other objects of the present invention, which will become apparent upon a reading of the following specification and claims, are achieved by a distiller including a tubular vaporizer tank to which is mounted a collector tube and condenser chamber extending from the top of the vaporizing tank and mounted extending downwardly alongside the tank with a discharge tube arranged to direct the outflow to a below-mounted reservoir tank. The vaporizer tank includes a rim trough extending around an intermediate section thereof adapted to receive inflowing water from a valve controlled connection to the water supply. Openings into the tank within the rim allow the water to flow into the tank interior with a water seal established by the water at the operating level. An overflow is mounted along side the vaporizer tank at another point and adapted to provide an overflow connection to drain and includes a stand pipe connected to the lower region of the vaporizer tank whereat the incoming water flow is collected.

An electrical heater element is mounted in the bottom of the vaporizer tank, operated by the automatic controls.

The entire assemblage is adapted to be mounted to a mounting plate or board such as to enable the assemblage to be wall mounted.

The condenser includes a connection to the water supply which directly inflow about the collector tube to cool and condense the steam and preheat the incoming water supply to thereby increase the energy efficiency of the unit.

The water is discharged into the rim through a flow control orifice to insure a relatively constant inflow rate notwithstanding some variations in supply pressure.

The automatic controls include a tank mounted float switch controlled the inlet valve to automatically maintain the water level in the vaporizer tank at a constant predetermined level.

In addition, a second float switch, mounted in the tank, is adapted to shut off the electrical heater upon decline of the water level in the vaporizer tank below safe levels.

Finally, a float switch is also mounted in the collecting reservoir to cause shut off of the incoming water supply and heater upon the distilled water level reaching a predetermined maximum level in the reservoir tank, causing both the electric heater and fill valve to be closed to cease further distiller operation.

DESCRIPTION OF THE PREFERRED EMBODIMENT

Figure 1:
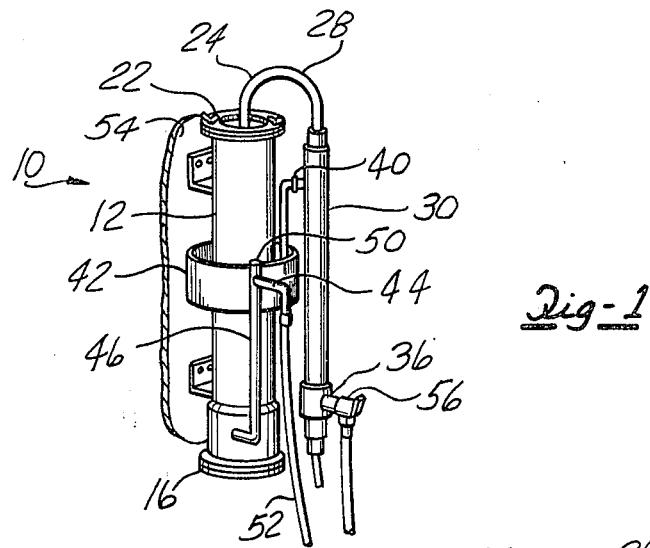
FIG. 1 is a perspective view of the major components of the distiller unit according to the present invention in a wall mounting position.
Figure 2:
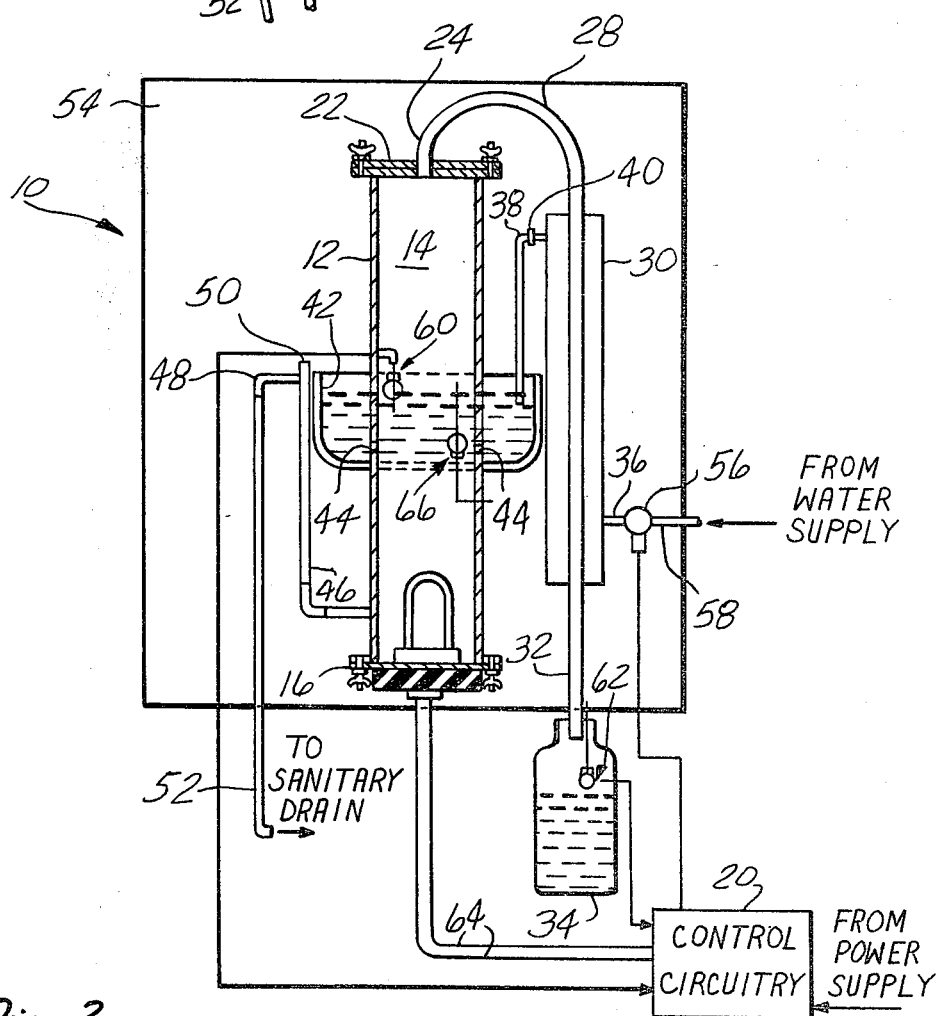
FIG. 2 is a diagrammatic representation of the complete distiller system together with the schematic representation of the automatic controls.

In the following detailed description certain specific terminology will be employed for the sake of clarity in a particular embodiment described in accordance with the requirements of 35 U.S.C. 112. However, it is to be understood that the same is not intended to be limiting and should not be so construed inasmuch as the invention is capable of taking many forms and variations within the scope of the appended claims.

Referring to the drawings, the components are mounted together into a compact assembly which includes a generally cylindrical tank 12 formed of a suitable metal or plastic material, which constitutes a vaporization tank 14. The lower end of the unit is closed off by a closure plate 16 which also serves to mount, in the tank 12 bottom, an electric heater 18 such as a Calrod type electrical resistance heater supplied with power via leads 64, energized by the control circuitry 20, as will be described in further detail hereinafter.

The upper end of the tank 12 is closed with a closure plate 22 which mounts a collector tube 24 of relatively rigid construction which is formed with a reverse bend 28 to extend back along side the tank 12. The collector tube 24 is in communication with the vaporization space 14 such that steam heat created by the operation of an electric heater 18 passes out through the collector tube 24. The collector tube 24 is received within a condenser jacket 30 and is directed downward alongside the tank 12.

The exit end 32 is disposed to direct distilled water from the steam formed in the space 14 into the reservoir container 34. The condenser jacket 30 receives, via an inlet 36, water from the local water supply which passes through the jacket 30 thereby cooling the steam passing through the collector tube 24 thence passing into a fill tube 38, adding feed stock or undistilled water to the tank 12.

A flow control orifice 40 is also provided which serves to smooth out the variations in flow rate produced by variations in supply pressure such as to provide a substantially constant fill rate into the vaporization tank 12.

The fill tube 38 is disposed extending into the filler rim trough 42 which is affixed to the exterior of the tank 12, passing to form an annular clearance space therebetween, into which the fill tube 38 extends. The rim trough 42 is in communication with inlet openings 44 disposed in the lower region thereof which allows the water to pass into the interior of the vaporization tank 14 while creating a liquid seal preventing the escape of steam.

The incoming water is thus preheated by the heat exchange relationship created by the arrangement of the heating jacket 30 such as to serve to cool the steam and condense the same while preheating the incoming water to relatively higher temperature to reduce the amount of heat necessary to produce boiling of the water in the vaporization chamber 14.

An overflow stand pipe 46 is also provided which communicates with the lower level of the tank 12 and extends up above the maximum level desired within the tank 12 below the edge of the rim 42. A downspout 48 and vent 50 are provided such that in the event of an overflow condition due to a malfunctioning valve, etc., the overflow is transmitted via hose 52 to a drain connection.

The entire assemblage is conveniently mounted as a unit to a mounting plate or board 54 which allows wall mounting of the major structural components of the distiller 10.

The automatic controls include a fill valve 56 which receives water from the water supply via inlet connections 58 and when open, causes inflow through the inlet tube 36, to the condenser 30, and via the fill line 38 into the interior of the tank 12. The operation of the fill valve 56 is controlled by the control circuitry 20.

The control circuitry 20, in turn, responds to the condition of the float switch 60 disposed to sense the water level within the tank 50 such that whenever the level reaches a predetermined maximum below the level of the rim 42, the fill valve 56 is opened until such time the level reaches the operating level. The control or flow orifice 40 serves to insure a constant fill rate when the fill valve 56 is opened by the control circuits 20.

A similar automatic feature is provided by a float switch 62, associated with the reservoir 34 which collects the distilled water, such that whenever the level in the reservoir 34 reaches its predetermined maximum, control circuitry 20 causes closing of the fill valve 56 and discontinues the operation of the Cal-rod heater 18 by electrically disconnecting it from the power supply.

A safety feature is also provided with another float switch 66 disposed in the tank 12. The float switch senses the water level declining below a predetermined minimum in the tank 12 such as would otherwise cause overheating or decline of the level of the fill openings 44, which is similarly responded to by the control circuit 20 to discontinue operation of the heater 18.

Accordingly, it can be appreciated that a highly efficient, compact distiller is provided by this construction which is so constructed as to conveniently be wall mounted and located to be conveniently accessible in the living areas within homes, businesses and the like. In the meantime, the operation is fully automatic and relatively fail-safe such that trouble free operation is insured. At the same time, the relative simplicity of the design enables its manufacture at relatively modest costs in keeping with the appropriate pricing for such consumer item.

What is claimed is:

1. A light-weight, compact and efficient distillation apparatus for periodically removing impurities from a quantity of water from a water supply by heating the water to be purified to form steam and condensing the steam to form distilled water, said distillation apparatus comprising:

a generally tubular vertically disposed member having a closed upper end and a closed lower end and forming a vaporization chamber therein;

a rim member extending about said tubular member at an intermediate level between said upper and lower end thereof and forming an annular rim trough for water around said tubular member, said rim trough having an opening permitting visual inspection of the level of water therein and further providing an overflow for said rim to limit the water level therein to a predetermined maximum level;

at least one aperture in said tubular member extending between said vaporization chamber and said rim trough for fluid communication therebetween such that said rim trough supplies water to said vaporization chamber and the water level in said vaporization chamber corresponds to the water level in said rim trough, said water in said rim trough forming a liquid seal between said vaporization chamber and the portion of said rim trough above said aperture such as to prevent the escape of steam from said vaporization chamber;

heating means disposed in said vaporization chamber below the level of said aperture such as to vaporize said water in said vaporization chamber;

a collector tube having a first end interconnected with said tubular member at a location above said aperture and communicating with said vaporization chamber and having a second end being reversely bent and extending downwardly therefrom such that vaporized water from said vaporization chamber is diverted therefrom along said collector tube;

a condenser tube having a larger diameter than said collector tube, said collector tube passing through the interior of said condenser tube and being affixed thereto, the ends of said condenser tube being closed off to define a sealed annular condensing chamber between said condenser tube and said collector tube;

an inlet to said condenser chamber;

first valve means for selectively regulating inflow from said water supply through said inlet into said condenser chamber such that the water from said water supply condenses the vaporized water in said collector tube;

a fill tube interconnecting said condenser chamber and said rim trough for fluid flow therebetween such that said fill tube supplies water to said rim trough and, thereby, to said vaporization chamber;

second valve means disposed along said fill tube and regulating the flow of water through said fill tube of said rim trough to provide a selectively controllable feed stock water supply for said vaporization chamber; and an outlet at said second end of said collector tube as to provide a supply of said condensed water from collector tube.

2. The dillation apparatus of claim 1, further comprising overflow means having a first end connected to said vaporization chamber and passing into communication with a portion of the interior of said vaporization chamber below said aperture, an intermediate portion extending upwardly therefrom to a location below said first predetermined maximum level, and extending downwardly therefrom, and a second end adapted to be connected to a drain connection, said opening in said rim providing secondary overflow means in the event of a failure of said primary overflow means.

3. The distillation apparatus of claim 1, wherein said tubular member is mounted to a mounting member for wall mounting thereof.

4. A lightweight, compact and efficient distillation apparatus for periodically removing impurities from a quantity of water from a water supply by heating the water to be purified to form steam and condensing the steam to form distilled water, said distillation apparatus comprising:

a generally tubular vertically disposed member having a closed upper end and a closed lower end and forming a vaporization chamber therein;

a rim member extending about said tubular member at an intermediate level between said upper and lower end thereof and forming an annular rim trough for water around said tubular member, said rim having an opening permitting visual inspection of the the level of water therein and further providing an overflow for said rim to limit the water level therein to a predetermined maximum level;

at least one aperture in said tubular member extending between said vaporization chamber and said rim trough for fluid communication therebetween such that said rim trough supplies water to said vaporization chamber and the water level in said vaporization chamber corresponds to the water level in said rim trough, said water in said rim trough forming a liquid seal between said vaporization chamber and the portion of said rim trough above said aperture such as to prevent the escape of steam from said vaporization chamber;

heating means disposed in said vaporization chamber below the level of said apertures such as to vaporize the water in said vaporization chamber;

a collector tube having a first end interconnected with said tubular member at a location above said aperture and communicating with said vaporization chamber and having a second end being reversely bent and extending downwardly therefrom such that vaporized water from said vaporization chamber is diverted therefrom along said collector tube;

a condenser tube having a larger diameter than said collector tube, said collector tube passing through the interior of said condenser tube and being affixed thereto, the ends of said condenser tube being closed off to define a sealed annular condensing chamber between said condenser tube and said collector tube;

an inlet to said condenser chamber;

first valve means for selectively regulating inflow from said water supply through said inlet into said condenser chamber such that the water from said water supply condenses the vaporized water in said collector tube and said rim trough for fluid flow therebetween such that said fill tube supplies water to said rim trough and, thereby, to said vaporization chamber;

second valve means disposed along said fill tube selectively regulating the flow of water through said fill tube to said rim trough to provide a selectively controllable feed stock water supply for said vaporization chamber;

an outlet at said second end of said collector tube such as to provide a supply of said condensed water from collector tube; and float switch means associated with said vaporization chamber and responsive to the decline of the liquid level in said vaporization chamber below a predetermined minimum level to selectively prevent operation of said heating means.

5. The distillation apparatus of claims 1, 4, further comprising:

a reservoir disposed to receive outflow of condensed water from outlet of said collector tube;

a float switch associated with said reservoir; and selectively operable control means for causing said heating means to be turned off and at least one of said valve means to be closed in response to the fluid level in said reservoir exceeding a third predetermined maximum level.

6. A lightweight, compact and efficient distillation apparatus for periodically removing impurities from a quantity of water from a water supply by heating the water to be purified to form steam and condensing the steam to form distilled water, said distillation apparatus comprising:

a generally tubular vertically disposed member having a closed upper end and a closed lower end and forming a vaporization chamber therein;

a rim member extending about said tubular member at an intermediate level between said upper and lower end thereof and forming an annular rim trough for water around said tubular member, said rim having an opening permitting visual inspection of the level of water therein and further providing an overflow for said rim to limit the water level therein to a predetermined maximum level;

at least one aperture in said tubular member extending between said vaporization chamber and said rim trough for fluid communication therebetween such that said rim trough supplies water to said vaporization chamber and the water level in said vaporization chamber corresponds to the water level in said rim trough, said water in said rim trough forming a liquid seal between said vaporization chamber and the portion of said rim trough above said aperture such as to prevent the escape of steam from said vaporization chamber;

heating means disposed in said vaporization chamber below the level of said apertures such as to vaporize the water in said vaporization chamber;

a collector tube having a first end interconnected with said tubular member at a location above said aperture and communicating with said vaporization chamber and having a second end being reversely bent and extending downwardly therefrom such that vaporized water from said vaporization chamber is diverted therefrom along said collector tube;

a condenser tube having a larger diameter than said collector tube, said collector tube passing through the interior of said condenser tube and being affixed thereto, the ends of said condenser tube being closed off to define a sealed annular condensing chamber between said condenser tube and said collector tube;

an inlet to said condenser chamber;

first valve means for selectively regulating inflow from said water supply through said inlet into said condenser chamber such that the water from said water supply condenses the vaporized water in said collector tube and said rim trough for fluid flow therebetween such that said fill tube supplies water to said rim trough and, thereby, to said vaporization chamber;

second valve means disposed along said fill tube selectively regulating the flow of water through said fill tube to said rim trough to provide a selectively controllable feed stock water supply for said vaporization chamber;

an outlet at said second end of said collector tube such as to provide a supply of said condensed water from collector tube; and float switch means associated with said vaporization chamber and responsive to the decline of the liquid level in said vaporization chamber below a predetermined minimum level to selectively prevent operation of said heating means.

7. The distillation apparatus of claims 1, 4, 6 wherein said second valve means comprises a flow orifice in said fill tube rim trough causing said flow to be substantially constant notwithstanding variations in supply pressure.

8. The distillation apparatus of claim 1, 3, 4 or 2 wherein said second valve means comprises a flow orifice in said fill tube rim trough causing said flow to be substantially constant notwithstanding variations in supply pressure.

* * * * *